(12) United States Patent
Grüdl (10) Patent No.: US 12,492,741 B2
(45) Date of Patent: Dec. 9, 2025

(54) KINEMATIC COMPONENT

(71) Applicant: GRAMMER Aktiengesellschaft, Ursensollen (DE)

(72) Inventor: Alexander Grüdl, Teuschnitz (DE)

(73) Assignee: GRAMMER Aktiengesellschaft, Ursensollen (DE)

( * ) Notice: Subject to any disclaimer, the term of this patent is extended or adjusted under 35 U.S.C. 154(b) by 0 days.

(21) Appl. No.: 18/637,835

(22) Filed: Apr. 17, 2024

(65) Prior Publication Data
US 2024/0360893 A1 Oct. 31, 2024

(30) Foreign Application Priority Data

Apr. 27, 2023 (DE) .................. 20 2023 102 298.7

(51) Int. Cl.
*F16H 37/12* (2006.01)
*B60H 1/34* (2006.01)

(52) U.S. Cl.
CPC ... *F16H 37/122* (2013.01); *B60H 2001/3471* (2013.01)

(58) Field of Classification Search
CPC .............. F16H 37/122; B60H 2001/3471
See application file for complete search history.

(56) References Cited

U.S. PATENT DOCUMENTS

2022/0097489 A1 3/2022 Tang
2024/0360892 A1* 10/2024 Grüdl .................. B60H 1/3421

FOREIGN PATENT DOCUMENTS

JP S61-044243 3/1986

OTHER PUBLICATIONS

Extended European Search Report for Europe Patent Application No. 24172121.6, dated Sep. 25, 2024, 12 pages.

* cited by examiner

*Primary Examiner* — Terence Boes
(74) *Attorney, Agent, or Firm* — Sheridan Ross P.C.

(57) ABSTRACT

A kinematic component comprising a first movably adjustable component, a second movably adjustable component and a device which has a rotatable actuator, wherein the device is preferably provided and designed for this purpose, transmitting a rotary movement of the actuator to the movably adjustable components, the first movably adjustable component being adjustable in a first direction of rotation of the actuator and the second movably adjustable component being adjustable in a second direction of rotation of the actuator, which is opposite to the first direction of rotation.

11 Claims, 10 Drawing Sheets

KINEMATIC COMPONENT

CROSS REFERENCE TO RELATED APPLICATION

This application claims the benefit of German Patent Application No. 20 2023 102 298.7, filed Apr. 27, 2023, the contents of which are incorporated herein by reference in its entirety.

FIELD

The present patent application relates to a kinematic component with a first and a second movably adjustable component.

BACKGROUND

For example, kinematic components such as air vents, headlights and the like are known from the prior art, some of which can reference themselves as soon as they recognise an end stop. If a second end stop is then travelled to, intermediate positions can be travelled to iteratively, as the driving actuator now knows the limits and can travel to intermediate positions by step counting. This is familiar from headlights with bend lighting, for example, which initially perform a left-right movement when the vehicle is started. By counting the steps taken during a movement, these actuators know which position they are in and therefore also which position the actuated components are in, for example the angle of a slat for deflecting air, the direction of the light cone in headlights, etc.

SUMMARY

It becomes difficult for such actuators if no end stops are provided, as is the case with endless rotating movements, for example. If the actuator loses its pre-stored reference, for example due to errors or a power failure, the system no longer knows the actual position of the individual parts. It is then important to interrogate the position at regular intervals in order to re-acquire the reference. The steps can then be counted again in order to be able to move to the desired positions. A component moved by the actuator actuates a sensor by means of a cam or a pin as soon as the component reaches a certain position/position. In this way, referencing is detected and the actuator now knows its position. If there are several actuators, a sensor is required for each one.

It is therefore the task of the present application to provide a kinematic component with a device by means of which the number of actuators can be reduced.

The underlying task is solved by a kinematic component as disclosed herein.

According to the invention, it is a core idea of the present application to provide a kinematic component with a first movably adjustable component, a second movably adjustable component and a device which has a rotatable actuator, the device preferably being provided and designed for this purpose, transmitting a rotary movement of the actuator to the movably adjustable components, the first movably adjustable component being adjustable in a first direction of rotation of the actuator and the second movably adjustable component being adjustable in a second direction of rotation of the actuator, which is opposite to the first direction of rotation.

A kinematic component is understood to be a component which comprises several movable components by means of which a function assigned to the component can be set. A purely exemplary and non-exhaustive example of such a component could be an air vent (also known as a ventilation nozzle) with several louvres, a headlight or the like.

A movably adjustable component can be understood in such a way that the function assigned to the kinematic component can be changed or adjusted by the movably adjustable components. In the example of the air vent, the movably adjustable components can be the louvres, which can deflect the air flow accordingly.

According to a preferred embodiment, a rotatable actuator is easily realised if the rotatable actuator is an electric motor. This can already have or provide two opposite directions of rotation. In principle, however, other actuators are also conceivable, which are intended and designed to enable or provide at least two opposite directions of rotation.

According to a further particularly preferred embodiment, the device further comprises a drive unit. The drive unit can be connected to the first movably adjustable component and the second movably adjustable component in such a way that the first movably adjustable component and/or the second movably adjustable component can be actuated by actuating the drive unit.

Further preferably, the drive unit can be actuated by the actuator and/or have the actuator. Particularly preferably, the actuator is designed such that it can have a first direction of rotation and a second direction of rotation. Further preferably, it can be provided that the first movably adjustable component can be actuated when the first direction of rotation is present and the second movably adjustable component can be actuated when the second direction of rotation is present. This makes it possible to actuate the movably adjustable components depending on the direction of rotation or depending on the respective direction of rotation and thus independently of each other.

Accordingly, the drive unit is preferably designed and provided in such a way that the first movably adjustable component can be actuated when the first direction of rotation is present and the second movably adjustable component can be actuated when the second direction of rotation is present.

The first direction of rotation and the second direction of rotation are particularly preferably opposite to each other.

According to a further preferred embodiment, it may be provided that the device has a first actuating element and a second actuating element, wherein preferably the first actuating element is connected to the drive unit and the first movably adjustable component and the second actuating element is connected to the drive unit and the second movably adjustable component.

By providing these actuating elements, it may be possible to make the transmission from the actuator via the drive unit to the movably adjustable components more compact, as the respective components can be connected to each other in a space-saving manner. The actuating elements are also preferably in active contact with the sensor unit, more preferably with the actuating element or the sensor.

According to another preferred embodiment, the device is free of end stops. This makes it possible to avoid unwanted stops of components, which can lead to damage. Preferably, it can be provided that the drive unit is designed in such a way that an endlessly rotating movement is possible for both the first movably adjustable component and the second movably adjustable component.

It is particularly preferable that an endlessly rotating movement in a first direction of rotation is possible with regard to the first movably adjustable component and an endlessly rotating movement in a second direction of rotation, which is opposite to the first direction of rotation, is possible with regard to the second movably adjustable component.

According to a further preferred embodiment, it can be provided that the drive unit has a first gear element and a second gear element. Further preferably, the first gear element is rotatable about a first axis of rotation and the second gear element is rotatable about a second axis of rotation. By providing gear elements or gears, rotary movements can be transmitted particularly well and safely.

The first gear element and the second gear element are in operative connection with each other, which means that the teeth of the gear elements mesh with each other and therefore the gear elements can interact with each other.

Movements can be transmitted particularly easily if the first axis of rotation and the second axis of rotation are essentially parallel to each other. Essentially means that tolerances due to the installation or structure must be taken into account, which can lead to minor deviations from parallelism.

According to a preferred embodiment, the actuator may be connected directly or indirectly to the gear elements. For example, it is conceivable that the actuator is connected directly to the first gear element or the second gear element and drives it directly. Alternatively, a drive gear element may be provided, which is connected to the actuator and is operatively connected to the first gear element or the second gear element, so that the actuator indirectly drives the gear elements. Due to the arrangement of the actuator with the gear elements, only one actuator is required to move the corresponding movably adjustable components.

According to a further preferred embodiment, it may be provided that the first actuating element is rotatable about a fourth axis of rotation, wherein a first connecting element is provided, which is connected to the first gear element and the first actuating element. Particularly preferably, the fourth axis of rotation is arranged perpendicularly or at an angle to the first or second axis of rotation. This makes it possible to arrange the corresponding components in a space-saving manner.

According to a further preferred embodiment, it may be provided that the first actuating element has a first pin element and the first connecting element has a first guide link, wherein the first pin element engages in the first guide link. During a movement, the first pin element can be guided accordingly by the first guide link, whereby the movement can then be transmitted to the first movably adjustable component.

According to a further preferred embodiment, it may be provided that the second actuating element has a second pin element and a second connecting element with a second guide link, wherein the second pin element engages in the second guide link. During a movement, the second pin element can be guided accordingly by the second guide link, whereby the movement can then be transmitted to the second movably adjustable component.

According to a further preferred embodiment, it may be provided that the first connecting element is connected to the first gear wheel by a first freewheel element. According to a further preferred embodiment, it may be provided that the second connecting element is connected to the second gear wheel by a second freewheel element.

By providing freewheel elements, the respective rotational movement can be transmitted or not transmitted.

The freewheel elements are preferably designed and intended to couple the elements to each other in only one direction of rotation, so that a rotational movement of the gear can be transmitted to the corresponding connecting element. This means that the corresponding elements are not connected to each other in the opposite direction of rotation, so that a rotational movement cannot be transmitted. This allows the independent actuation of the movably adjustable components to be further developed.

The freewheel element can therefore be regarded as a clutch that only acts in one direction of rotation.

The freewheel elements can be designed in a wide variety of ways. Purely by way of example and not exhaustively, the freewheel elements can be at least one of the following examples: a freewheel working in a magnetic manner, a freewheel with clamping rollers, a freewheel with pawl(s), a spring-wound freewheel, a freewheel damper, a sleeve freewheel or any combination of the above.

Further embodiments and configurations in the embodiments are applicable to the other embodiments and can be freely combined with one another, provided that they do not correspond to opposing embodiments.

Further advantageous embodiments are shown in the subclaims.

Further objectives, advantages and usefulness of the present invention can be seen from the following description in conjunction with the drawings.

The invention is illustrated in more detail below in conjunction with the figures.

DETAILED DESCRIPTION

In the figures, identical components are to be understood with the corresponding reference signs. For the sake of clarity, components may not be labelled with a reference sign in some figures, but have been designated elsewhere.

The following figures are exemplary for a kinematic component 1, which is designed as an air vent. However, the designs, embodiments and the like are also transferable to other kinematic components in an analogous manner. The examples shown are for the purpose of explanation and functionality and are not intended to be exhaustive or restrictive with regard to the kinematic component 1.

Figure 1A:
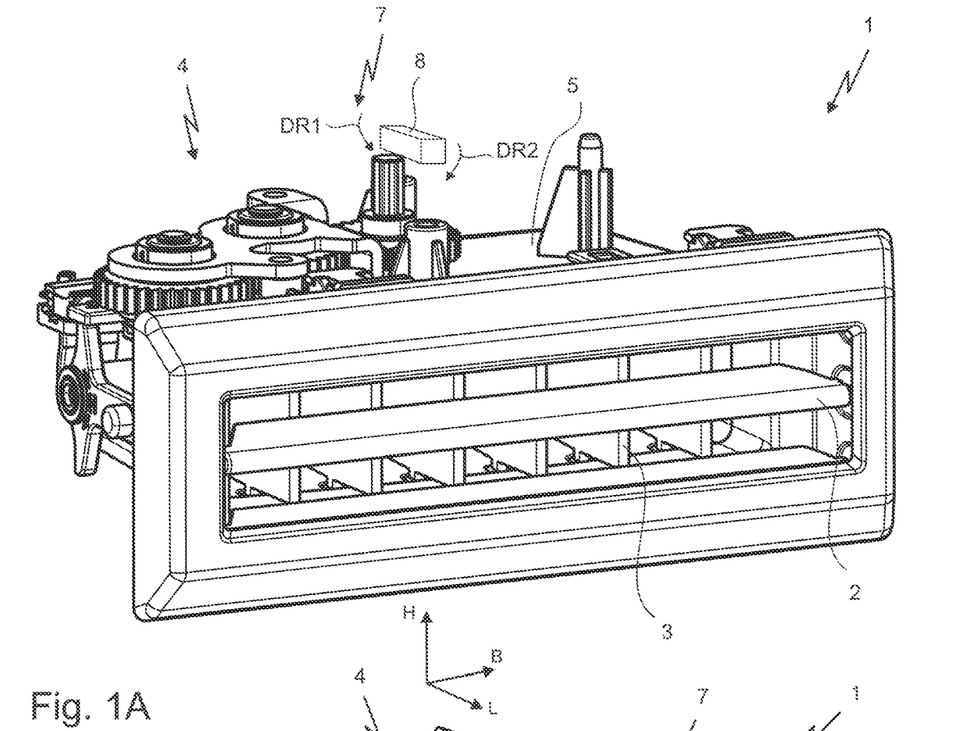
FIG. 1A a kinematic component according to one embodiment in a perspective view from the front, FIG. 1B a perspective view of the kinematic component according to FIG. 1A from behind.

In FIG. 1A, a kinematic component 1 is shown as an example in a perspective view from the front, which is preferably an air vent. The kinematic component 1 comprises a first movably adjustable component 2, represented by horizontally extending louvres, and a second movably adjustable component 3, represented by vertically extending louvres.

The kinematic component 1 has a first movably adjustable component 2, a second movably adjustable component 3 and a device 4, which has a rotatable actuator 8, wherein the device 4 is intended and designed to transmit a rotary movement of the actuator 8 to the movably adjustable components 2, 3, wherein the first movably adjustable component 2 is adjustable in a first direction of rotation DR1 of the actuator 8 and the second movably adjustable component 3 is adjustable in a second direction of rotation DR2 of the actuator 8, which is opposite to the first direction of rotation DR1.

Furthermore, the device 4 is shown, which is intended and designed to adjust the movably adjustable components 2, 3 independently of one another. Preferably, the device 4 comprises a drive unit 7, which is connected to a rotatable actuator 8 on the one hand and to the first movably adjustable component 2 and the second movably adjustable component 3 on the other hand, wherein preferably the drive unit 7 can be actuated by means of the actuator 8 and the first movably adjustable component 2 can be adjusted in a first direction of rotation DR1 of the actuator 7 and the second movably adjustable component 3 can be adjusted in a second direction of rotation DR2, which is opposite to the first direction of rotation DR1.

Figure 1B:
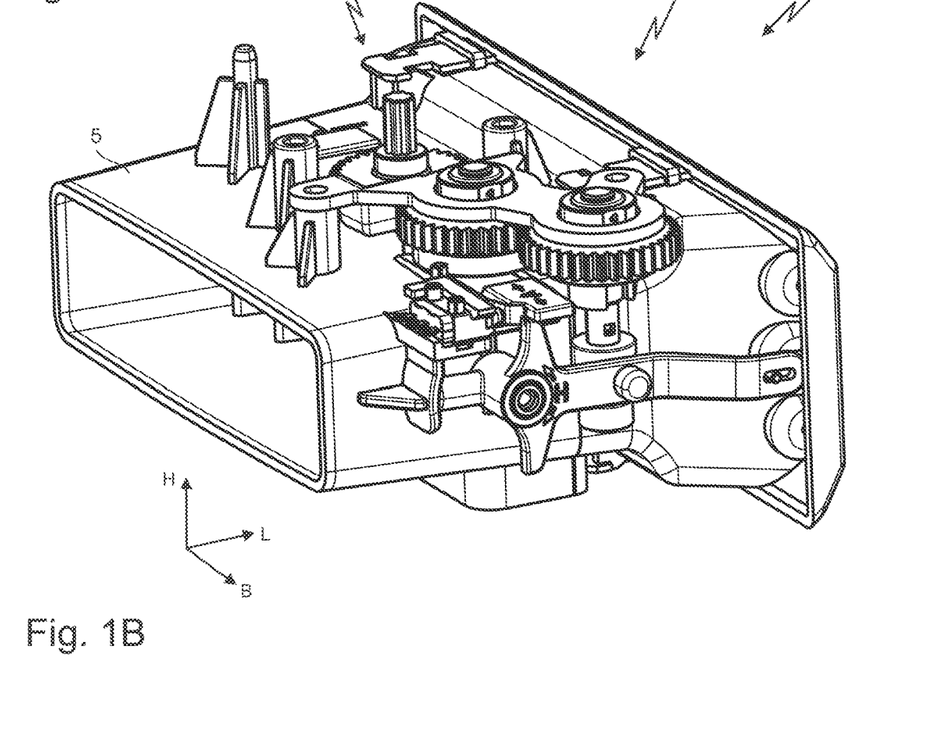

In FIG. 1B, the kinematic component 1 of FIG. 1A is shown in a perspective view from behind.

In general, the kinematic component 1 can be installed in a further part, for example in an interior of a vehicle or the like.

By actuating the movably adjustable components 2, 3, in the present embodiment, it is possible to deflect an air flow, which is guided through the air duct 6, accordingly.

The first movably adjustable component 2 deflects the air flow in a height direction H upwards and downwards and the second movably adjustable component 3 deflects the air flow in a width direction B to the left and right.

Figure 1C:
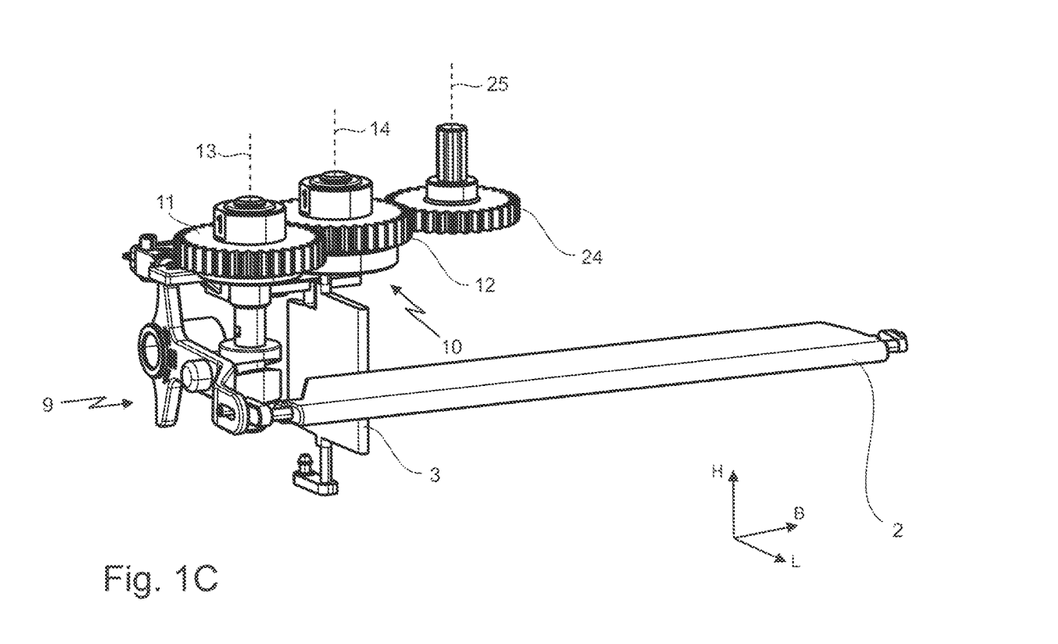
FIG. 1C a section of FIG. 1A.
Figure 1D:
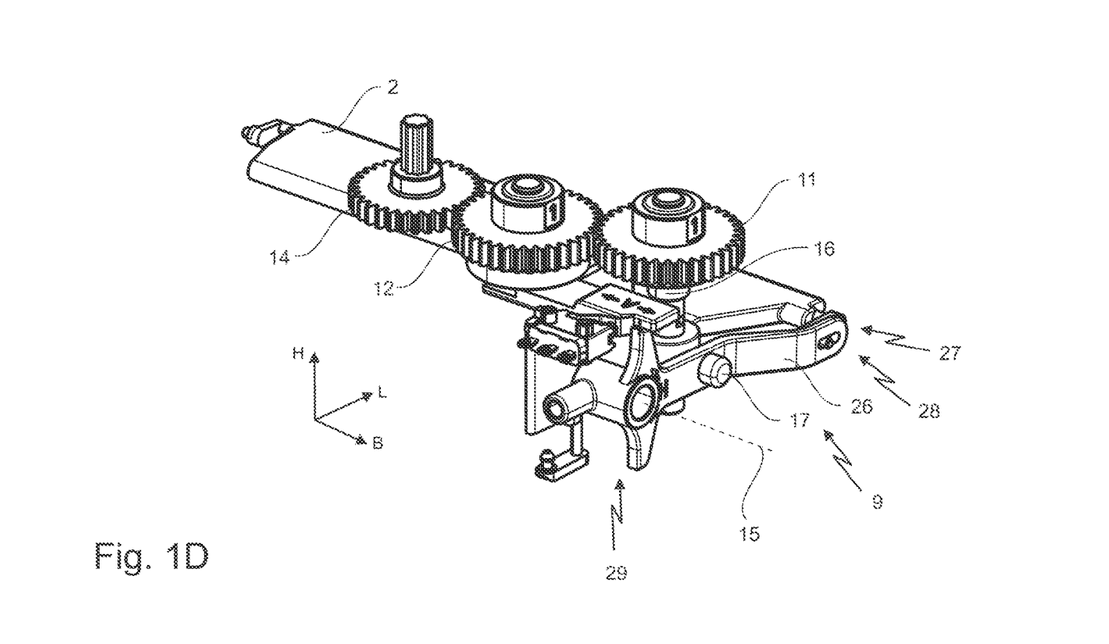
FIG. 1D a section of FIG. 1B.

FIG. 1C shows the design shown in FIG. 1A again, whereby some components have been omitted. In FIG. 1D, the design shown in FIG. 1B is illustrated again, whereby some components have been omitted.

FIGS. 1A to 1D can be used to illustrate the drive unit 7 in more detail, in a first embodiment.

According to a preferred embodiment, it may be provided that the drive unit 7 has a first gear element 11, which is rotatable about a first axis of rotation 13, and a second gear element 12, which is rotatable about a second axis of rotation 14.

Preferably, the drive unit 7 is in operative contact with a first actuating element 9 and with a second actuating element 10. The first actuating element 9 is connected on the one hand to the drive unit 7 and on the other hand to the first movably adjustable component 2. The second actuating element 10 is connected on the one hand to the drive unit 7 and on the other hand to the second movably adjustable component 3.

Further preferably, the actuator 8 can be at least operatively connected directly or indirectly to the drive unit 7. An indirect connection is shown in FIGS. 1C and 1D in that a drive gear element 24, which is rotatable about a third axis of rotation 25, is provided. Preferably, the drive gear element 24 is in contact with the first gear element 11 or the second gear element 12, so that a rotation of the drive gear element 24 can be transmitted to the other gear elements 11, 12. The drive gear element 24 can also be in contact with the first gear element 11 and the second gear element 12, so that the drive gear element 24 drives both gear elements 11, 12.

Alternatively, seen as a direct connection, it can also be provided that the actuator 8 directly drives the first gear element 11 or the second gear element 12.

Particularly preferably, the first axis of rotation 13 and the second axis of rotation 14 are arranged parallel to each other; further preferably, the first axis of rotation 13 and the second axis of rotation 14 are parallel to each other and parallel to the height direction H. The third axis of rotation 25 is parallel to the axes of rotation 13, 14, but can alternatively also be perpendicular or at a different angle to these axes of rotation 13, 14, whereby, for example, the gear elements 11, 12 can be designed as bevel gears. In principle, the torque transmission can be designed using known gear wheel geometries, belt drives, friction wheels or similar.

The actuating elements 9, 10 and their connection to the drive unit 7 or the gears 11, 12 of the drive unit 7 are shown in more detail in the other figures.

The first actuating element 9 is arranged to rotate about a fourth axis of rotation 15. Preferably, the fourth axis of rotation 15 is stationary with respect to the kinematic component 1, i.e. the fourth axis of rotation 15 does not change its position with respect to the kinematic component 1. For this purpose, the first actuating element 9 can be arranged on a housing, on the air duct 5 or the like.

Further preferably, the first actuating element 9 is connected to the first movably adjustable component 2 in such a way that the first movably adjustable component 2 is also actuated by movements of the first actuating element 9. For this purpose, the first actuating element 9 preferably has a lever element 26, which preferably extends in a longitudinal direction L. A first end 27 is connected to the first movably adjustable component 2, for example by means of a slot-and-pin connection 28, and a pivot point of the lever element 25, for example the second end 29, is connected to the fourth axis of rotation 15. The pivot point of the lever element 26 can preferably be arranged at any position with respect to the lever element 26.

Preferably, a first pin element 17 is provided, which preferably extends away from the lever element 26 or the first actuating element 9, for example in the width direction B or at an angle thereto. Preferably, the first pin element 17 is fixedly connected to the first actuating element 9. Further preferably, the first pin element 17 is arranged between the fourth axis of rotation 15 or the second end 29 and the first end 27 as viewed in the longitudinal direction L. Alternatively, the pin element 17 can also be arranged at a different position of the lever element 26. Thus, it may be that the fourth axis of rotation 15 is arranged between the first pin element 17 and the first end 27. This means that the first end 27 and the first pin element 17 are arranged on opposite sides with respect to the fourth axis of rotation 15 on the lever element 26. Preferably, the first pin element 17 is in connection with a first guide link 18 (not shown here). Preferably, the first pin element 17 extends along a width direction B.

Figure 2A:
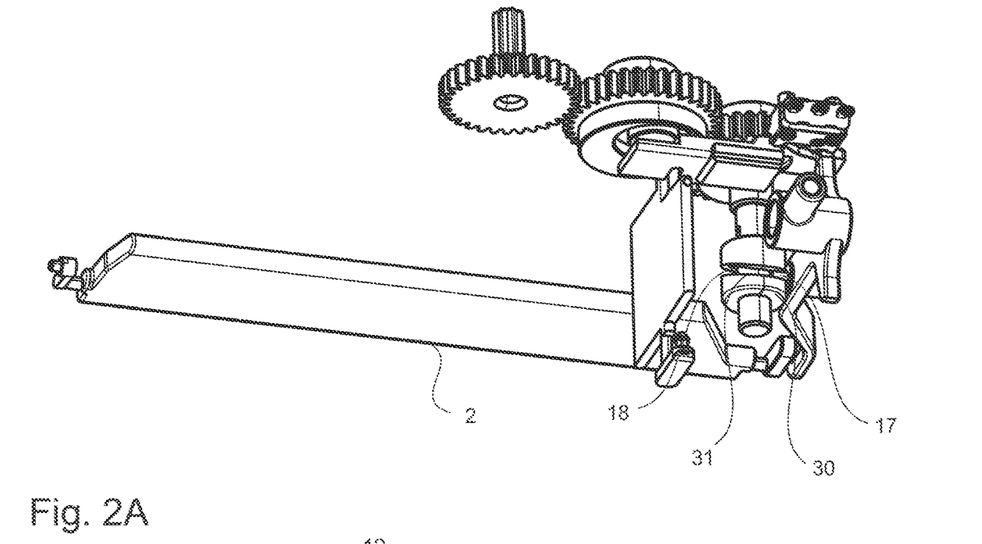
FIG. 2A a perspective view of FIG. 1D from below.

FIG. 2A shows such a connection in more detail. The first guide link 18 is such that a cylindrical component 30 is provided with a notch 31, which forms the first guide link 18. The notch 31 is such that it is arranged on the entire cylindrical component 30 in the circumferential direction and is closed in itself, i.e. has no end, whereby an endlessly rotating movement is possible. The notch 31 is undulating and/or stepped and/or helical and/or spiral-shaped to or in the height direction H, so that upward and downward movement of the first movably adjustable component 2 is made possible, since the first pin element 17 follows this first guide link 18, transmits the movement to the first actuating element 9 and this movement in turn to the first movably adjustable component 2.

Figure 2B:
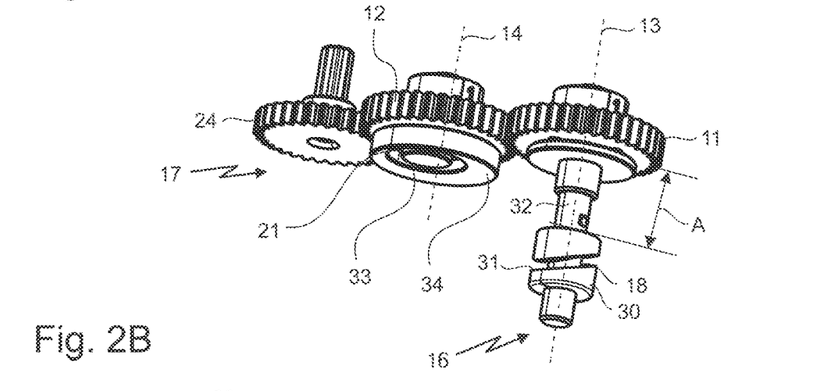
FIG. 2B a section of FIG. 2A.
Figure 2C:
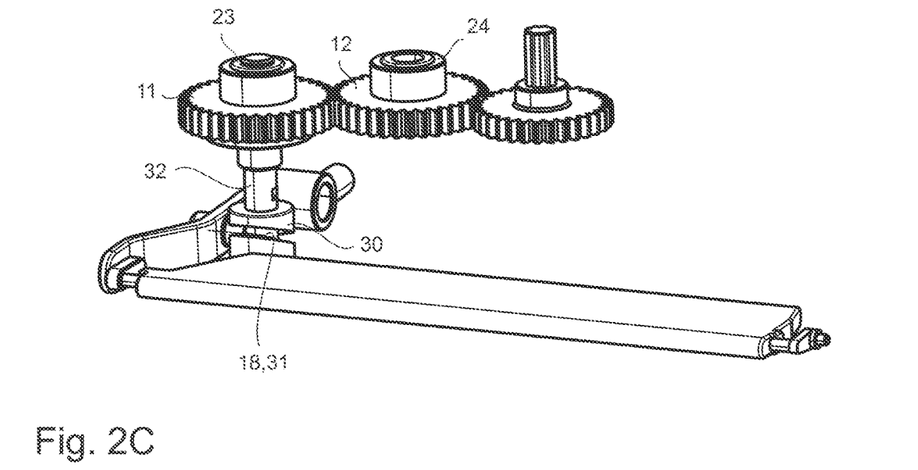
FIG. 2C a section of FIG. 1C.

Another illustration can also be taken from FIG. 2B. The cylindrical component 30 is connected to the first gear element 11 such that when the first gear element 11 rotates in one direction of rotation DR1, DR2, the cylindrical component 30 undergoes a corresponding rotation and when it rotates in the opposite direction of rotation DR1, DR2, it does not undergo any rotation. This is preferably achieved by means of a freewheel element 22, 23. Preferably, the cylindrical component 30 is spaced apart from the first gear element 11 by a distance A in the height direction H, which is preferably possible by means of a first connecting element 32. The first connecting element 32 is connected on the one hand to the first gear element 11 in the manner described and on the other hand to the cylindrical component 30. A further illustration can be taken from FIG. 2C.

FIG. 2B also shows, with regard to the second gear element 12, a further guide by means of a second guide link 21. The second guide link 21 is a notch 33 in a further cylindrical component 34, which is preferably arranged below the second gear wheel element 12, i.e. the cylindrical component 34 is arranged below the second gear wheel 12 in the height direction H.

Particularly preferably, the notch 33 or the second guide link 21 is a circular ring, which is preferably arranged eccentrically to the second axis of rotation 14. Alternatively, the second guide link 21 is oval-shaped, heart-shaped or the like, whereby the specified embodiments are merely intended as examples. In principle, any possible shape can be provided for the second guide link 21 which allows a second pin element 20 to be displaced in the width direction B. Likewise, the second guide link 21 is designed in such a way that the second pin element 20 can be guided without snagging or blocking. Preferably, the second guide link 21 can be arranged eccentrically with respect to the axis of rotation 14. The properties of the second guide link 21 can also be transferred to other links and can be provided.

The second guide link 21 can also be engaged by the second pin element 20, which can be moved by the moving second guide link 21 and can then transmit the movement to the second movably adjustable component 3 accordingly. The second pin element 20 is shown, for example, in FIG. 2D. As can be seen further, the second pin element 20 is connected directly or indirectly to the second movably adjustable component 3.

Figure 2D:
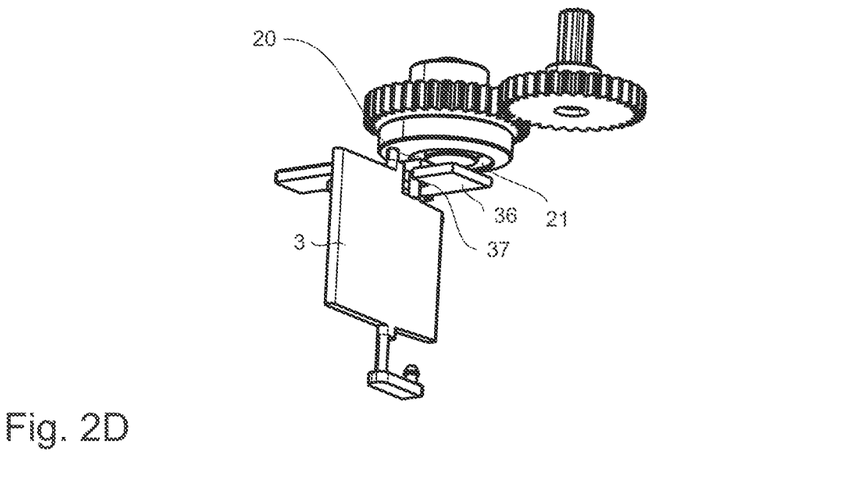
FIG. 2D a section of FIG. 2A.

Furthermore, a sliding element 36 may be provided, which preferably comprises the second pin element 20. Preferably, the sliding element 36 is designed such that it is linearly displaceable by the rotary movement of the second guide link 21 or the movement of the second pin element 20, preferably in the direction of the width direction B. Particularly preferably, the sliding element 36 has a mounting 37 in which the second movably adjustable component 3 engages and can thus be moved accordingly with the movement of the sliding element 36.

According to a particularly preferred embodiment, it may be provided that the first gear element 11 and the cylindrical component 30 or the first connecting element 16 are connected to each other by means of a first freewheel element 22. Further preferably, the second gear element 13 and the second connecting element 17 or the cylindrical component 34 are connected to one another by means of a second freewheel element 23. The freewheel elements 22, 23 are preferably designed and intended to couple the elements to one another only in one direction of rotation DR1, DR2, so that a rotary movement of the gear elements 11, 12 can be transmitted to the further element. This means that the corresponding elements are not connected to each other in the opposite direction of rotation DR1, DR2, so that a rotary movement cannot be transmitted. This allows the independent actuation of the movably adjustable components 2, 3 to be further developed.

The freewheel element 22, 23 can therefore be regarded as a clutch acting only in one direction of rotation DR1, DR2.

The freewheel elements 22, 23 can be designed in a wide variety of ways. Purely by way of example and not exhaustively, the freewheel elements 22, 23 can be at least one of the following examples: a freewheel operating in a magnetic manner, a freewheel with clamping rollers, a freewheel with pawl(s), a spring-wound freewheel, a freewheel damper, a sleeve freewheel, or any combination of the foregoing.

Figure 2E:
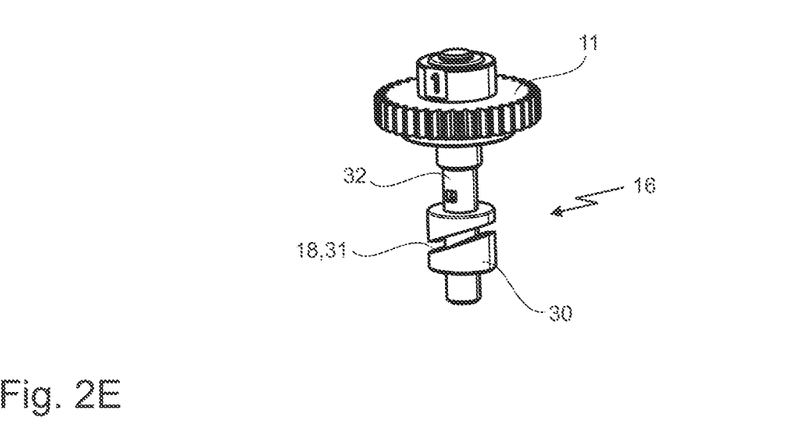
FIG. 2E a section of FIG. 2A.
Figure 2F:
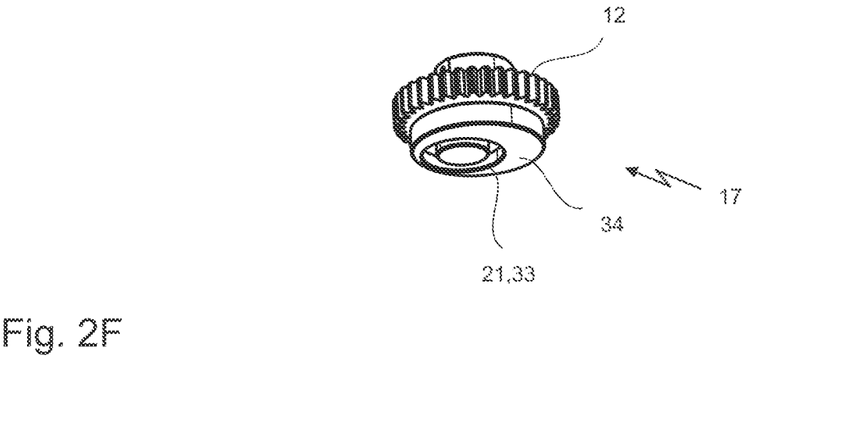
FIG. 2F a section of FIG. 2A.

In FIGS. 2E and 2F, the connecting elements 16, 17 of FIGS. 2A-2D are shown individually.

Instead of the cylindrical component 30, by means of which the first actuating element 9 can be actuated, it can be provided according to an alternative embodiment that the first connecting element 16 is provided as a fourth gear element 39, which is rotatable about a fifth axis of rotation 40, whereby the first actuating element 9 can be actuated by means of the fourth gear element 39.

This embodiment is shown, for example, in FIGS. 3A to 3E, each of these figures showing a part of the kinematic component 1 or the device 4, in different embodiments.

For a more compact embodiment, it is particularly preferred that the fifth axis of rotation 40 is perpendicular to the first axis of rotation 13 and/or the second axis of rotation 14. A gear rim 41 is connected to the first gear element 11 or to it, which is intended to be operatively connected to the fourth gear element 39, so that movements of the first gear element 11 can be transmitted to the gear rim 41, depending on the direction of rotation DR1, DR2, and from the gear rim 41 to the first actuating element 9. It is also conceivable that the fifth axis of rotation 40 and the first axis of rotation 13 are not perpendicular to each other, but are arranged at an acute angle or obtuse angle to each other, depending on the reference axis or observation.

Preferably, the fourth gear wheel 39 is designed in such a way that a third guide slot 42 is provided alternatively to the first guide link 18, in which the first pin element 17 can be guided so that the first actuating element 9 can be moved accordingly. The third guide slot 42 is preferably closed in itself. Preferably, the third guide slot 42 can be circular or oval or have a different shape. Preferably, the design of the third guide slot 42 is such that a movement along the height direction H is well formed and can be followed, that is, that the first pin element 17 can be moved in or along the height direction H.

Figure 4A:
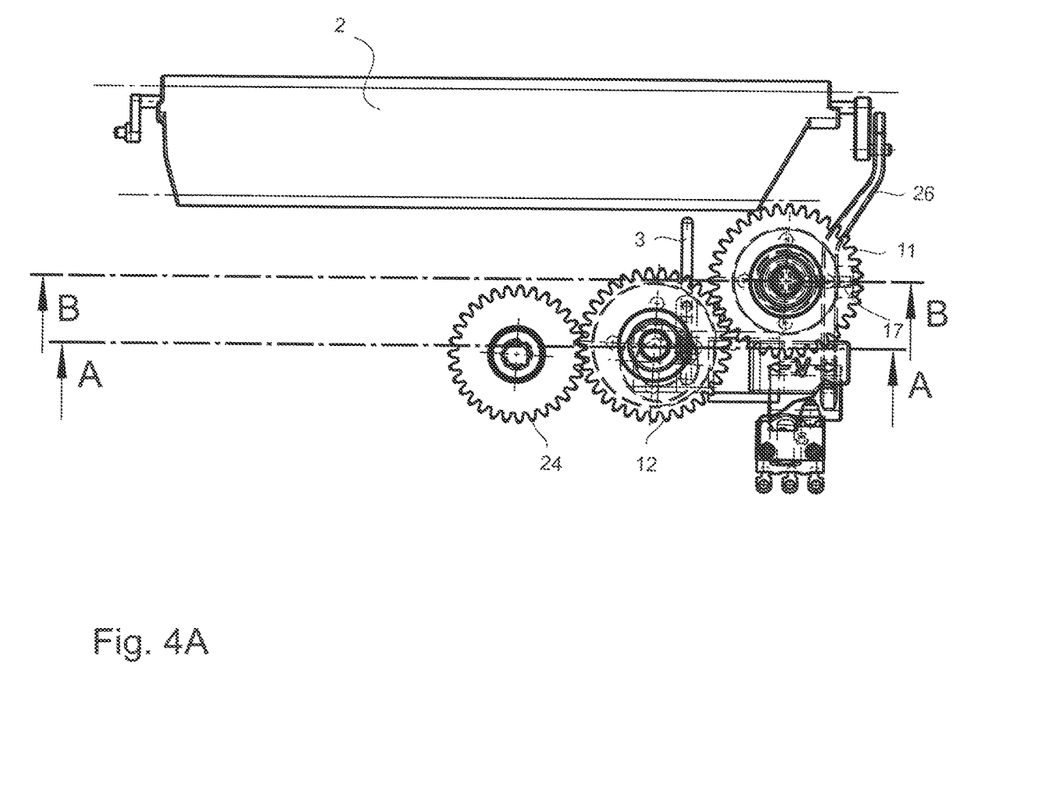
FIG. 4A a top view of FIG. 1C.
Figure 4B:
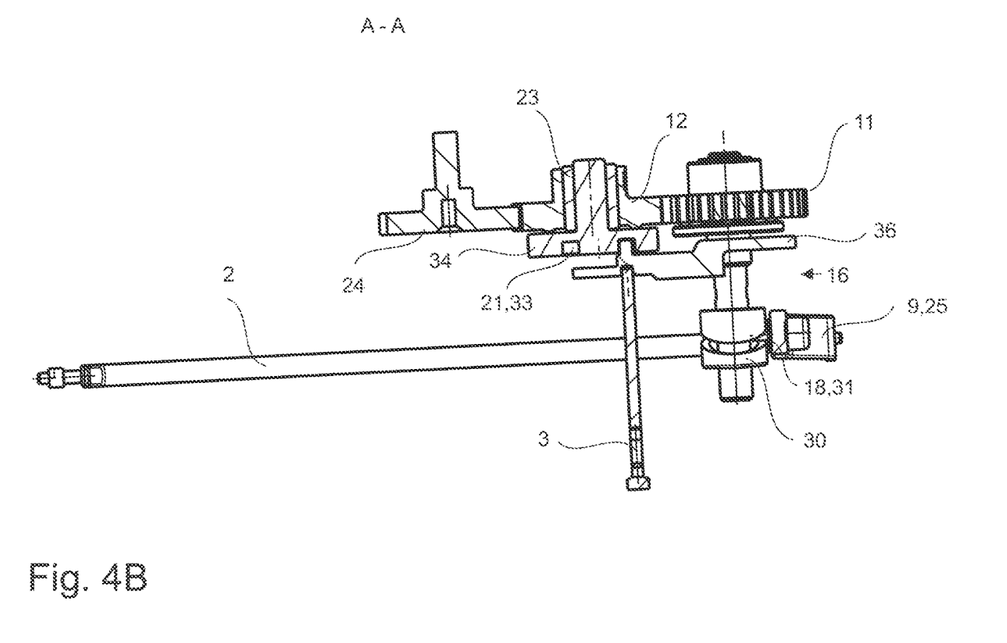
FIG. 4B the section A-A of FIG. 4A.
Figure 4C:
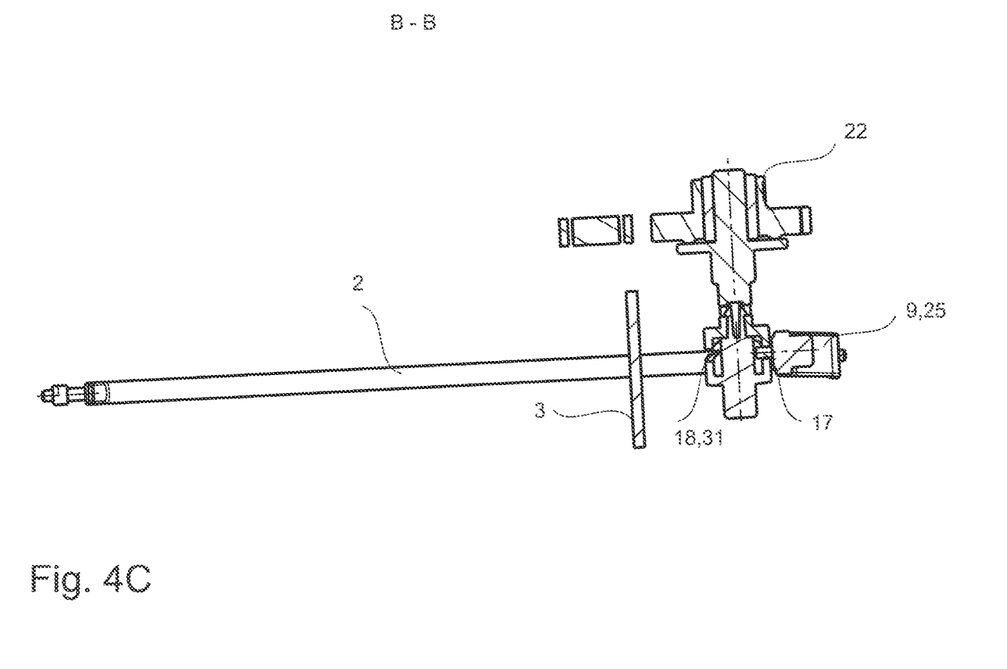
FIG. 4C the section B-B of FIG. 4A.

FIG. 4A shows a plan view of FIG. 1C. FIG. 4B shows section A-A, FIG. 4C shows section B-B.

Figure 3A:
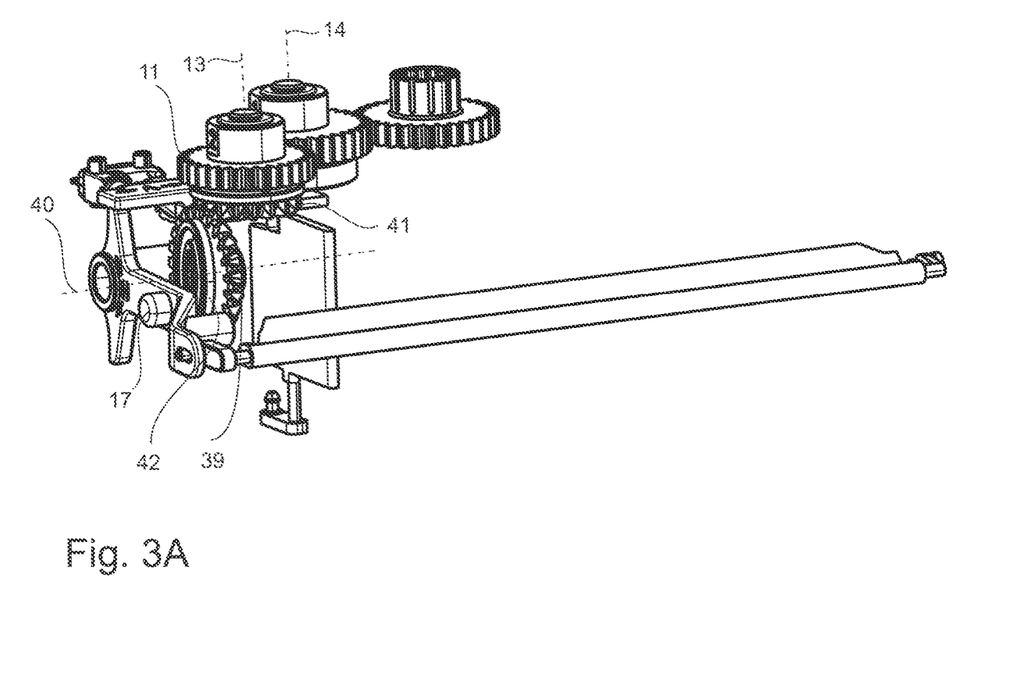
FIG. 3A a further embodiment of a section of the kinematic component in a perspective view from the front.
Figure 3B:
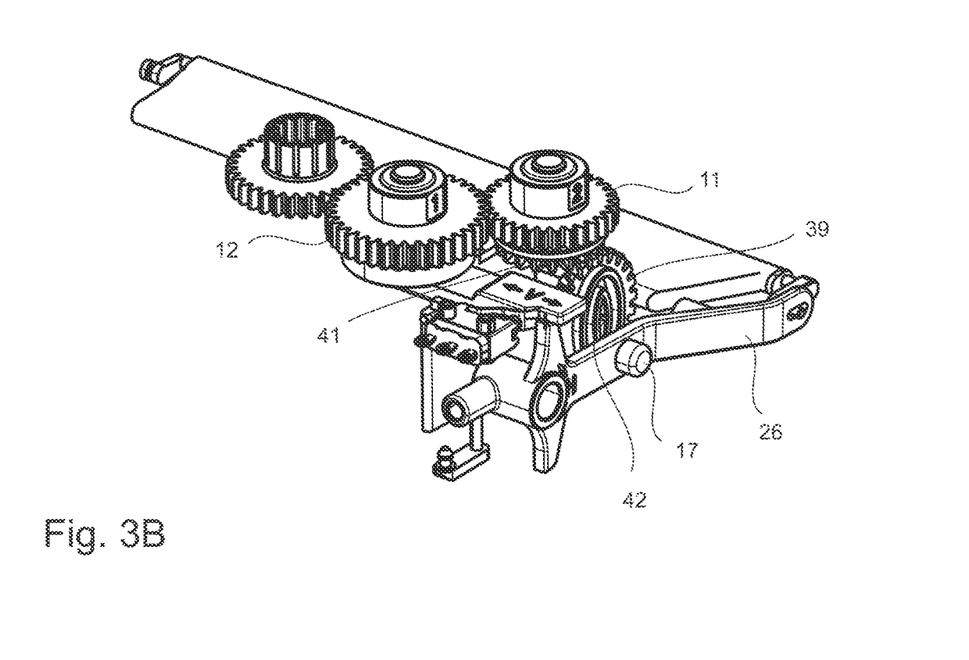
FIG. 3B a perspective view of FIG. 3A from above and behind.
Figure 3C:
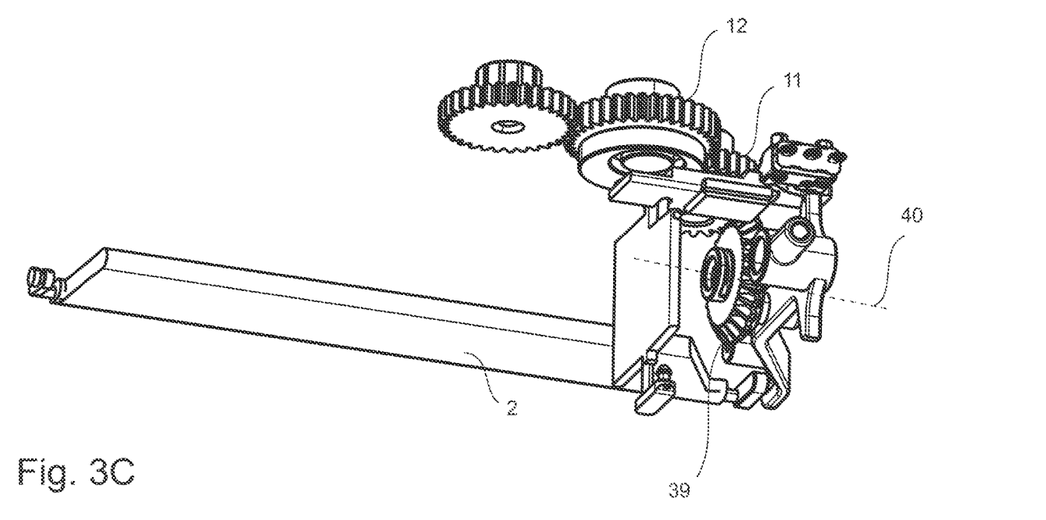
FIG. 3C a perspective view of FIG. 3A from below.
Figure 3D:
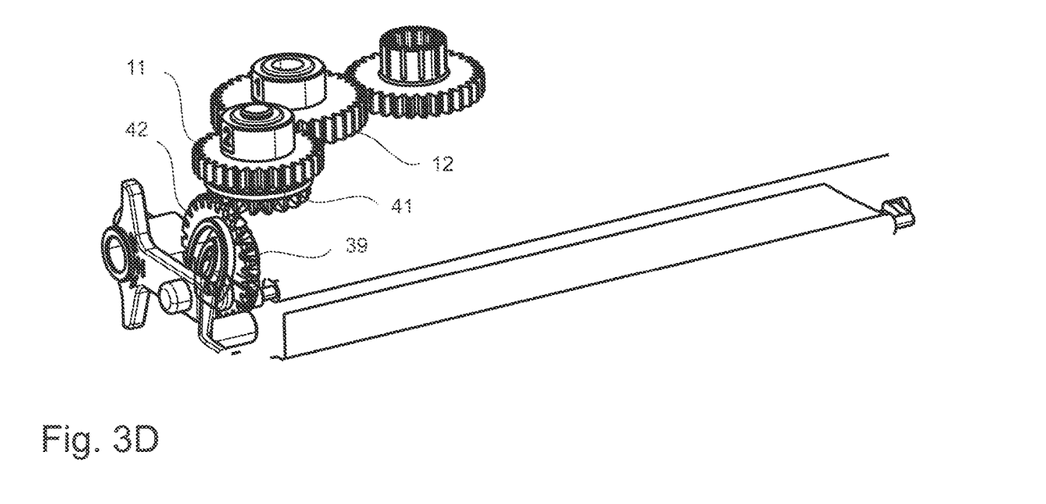
FIG. 3D a section of FIG. 3A.
Figure 3E:
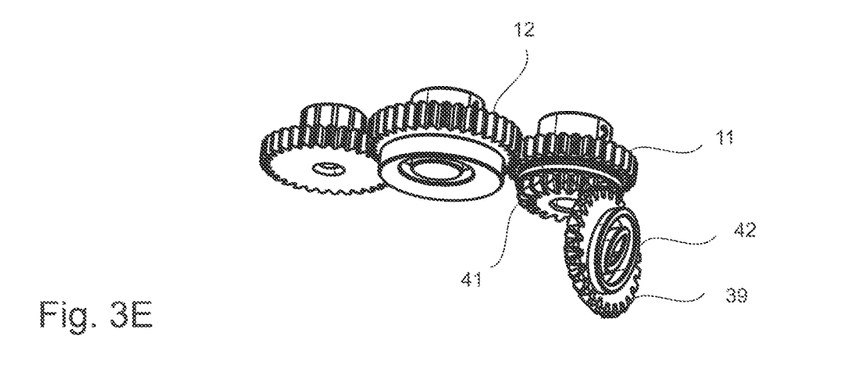
FIG. 3E a section of FIG. 3C.
Figure 5A:
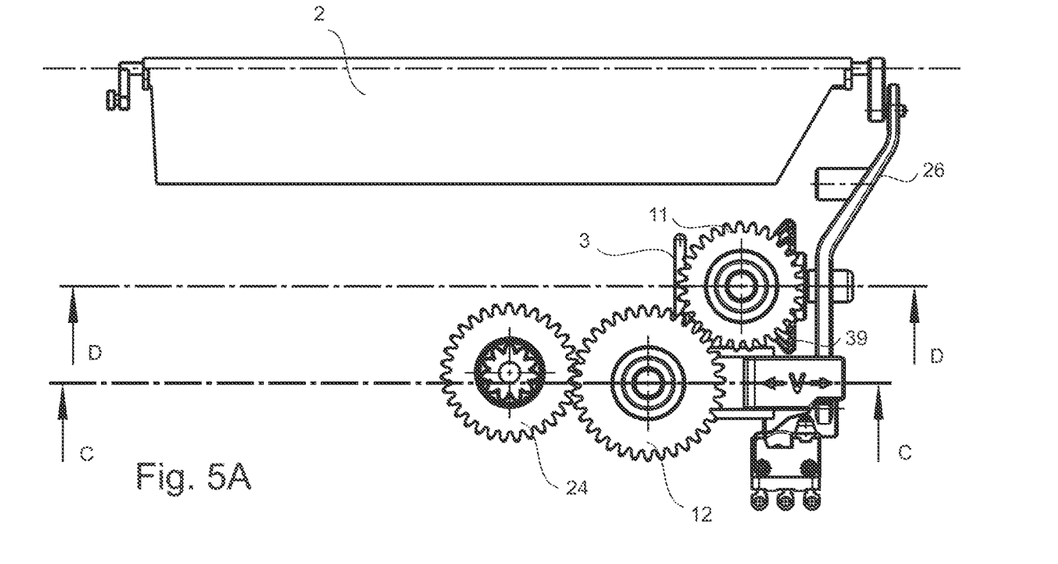
FIG. 5A is a plan view of FIG. 3B.
Figure 5B:
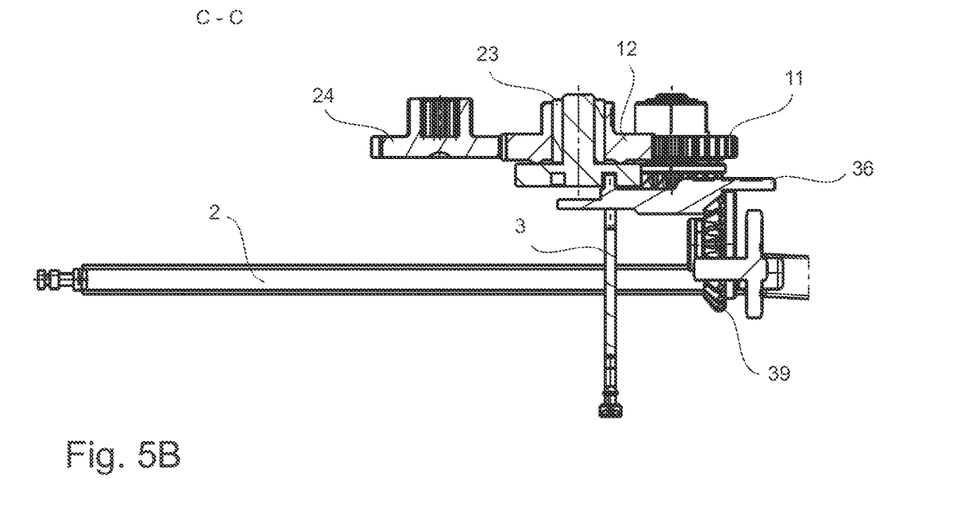
FIG. 5B the section C-C of FIG. 5A.
Figure 5C:
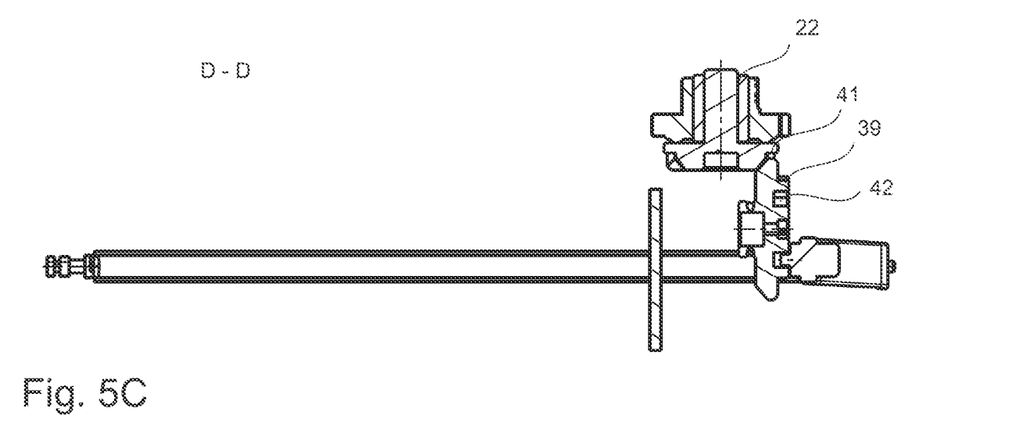
FIG. 5C the section D-D of FIG. 5A.

FIG. 5A shows a plan view of FIG. 3A. FIG. 5B shows section C-C, FIG. 5C shows section D-D.

Figure 6:
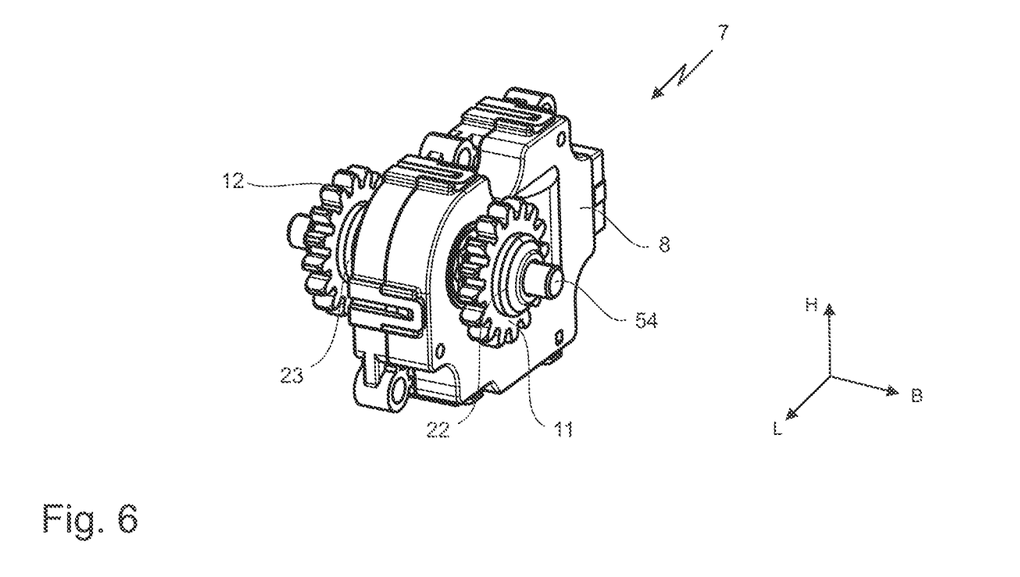
FIG. 6 an embodiment of the drive unit.

FIG. 6 shows a further embodiment of a drive unit 7 with an actuator 8. Here, the actuator 8 is arranged in width direction B between the first gear wheel 11 and the second gear wheel 12, wherein the gear wheels 11, 12 are arranged on a common shaft 54. Further, freewheels 22, 23 are again provided, whereby the first gear wheel 11 rotates only in one direction of rotation DR1, DR2 and the second gear wheel 12 rotates only in the further direction of rotation DR1, DR2.

All the features listed can be combined with one another in any desired manner.

All the features disclosed in the application documents are claimed to be essential to the invention insofar as they are new, either individually or in combination, compared with the prior art.

LIST OF REFERENCE SIGNS

1 Kinematic component
2 First movably adjustable component
3 Second movably adjustable component
4 Device
5 Air duct
7 Drive unit
8 Actuator, electric motor
9 First actuating element
10 Second actuating element
11 First gear element
12 Second gear element
13 First axis of rotation
14 Second axis of rotation
15 Fourth axis of rotation
16 First connecting element
17 First pin element
18 First guide link
19 Second connecting element
20 Second pin element
21 Second guide link
22 First freewheel element
23 Second freewheel element
24 Drive gear element
25 Third axis of rotation
26 Lever element
27 First end
28 Slot-and-pin connection
29 Second end
30 Cylindrical component
31 Notch
32 First connecting element
33 Notch
34 Further cylindrical component
36 Sliding element
37 Mounting
39 Fourth gear element
40 Fifth axis of rotation
41 Gear rim
42 Third guide link
54 Shaft
DR1 First direction of rotation
DR2 Second direction of rotation
L Longitudinal direction
B Width direction
H Height direction

What is claimed is:

1. A kinematic component, comprising:
a first movably adjustable component, a second movably adjustable component; and
a device which has a rotatable actuator, the device being provided and designed to transmit a rotational movement of the actuator to the movably adjustable components,
wherein the first movably adjustable component is adjustable in a first direction of rotation of the actuator and the second movably adjustable component is adjustable in a second direction of rotation of the actuator, which is opposite to the first direction of rotation,
wherein a drive unit of the device has a first gear element and a second gear element,
wherein a first cylindrical component that includes a first guide link is connected to the first gear element, and
wherein a second cylindrical component that includes a second guide link is connected to the second gear element, wherein the first guide link is formed as a notch in the first cylindrical component, and wherein the second guide link is formed as a notch in the second cylindrical component.

2. The kinematic component according to claim 1, wherein
the rotatable actuator is an electric motor.

3. The kinematic component according to claim 1, wherein
the drive unit is connected to a rotatable actuator on the one hand and to the first movably adjustable component and the second movably adjustable component on the other hand, and wherein the drive unit can be actuated by means of the actuator.

4. The kinematic component according to claim 3, wherein
the device has a first actuating element and a second actuating element, the first actuating element being connected to the drive unit and the first movably adjustable component and the second actuating element being connected to the drive unit and the second movably adjustable component.

5. The kinematic component according to claim 3, wherein
the first gear element is rotatable about a first axis of rotation and the second gear element is rotatable about a second axis of rotation.

6. The kinematic component according to claim 5, wherein
the first axis of rotation and the second axis of rotation are essentially parallel to one another.

7. The kinematic component according to claim 5, wherein
the first actuating element is rotatable about a fourth axis of rotation, a first connecting element being provided, which is connected to the first gear element and the actuating element.

8. The kinematic component according to claim 7, wherein
the first actuating element has a first pin element and the first connecting element has a first guide link, wherein the first pin element engages in the first guide link.

9. The kinematic component according to claim 7, wherein
the first connecting element is connected to the first gear element by a first freewheel element.

10. The kinematic component according to claim 4, wherein
the second actuating element has a second pin element and a second connecting element with a second guide link, the second pin element engaging in the second guide link.

11. The kinematic component according to claim 10, wherein
the second connecting element is connected to the second gear element by a second freewheel element.

* * * * *